United States Patent [19]
Yokoshima

[11] Patent Number: 5,407,483
[45] Date of Patent: Apr. 18, 1995

[54] METHOD FOR IMPREGNATING A LINING MATERIAL WITH A HARDENABLE RESIN

[75] Inventor: Yasuhiro Yokoshima, 175-3 Ooaza-shinoyama, Ishige-cho, Yuki-gun, Ibaraki-ken, Japan

[73] Assignees: Yasuhiro Yokoshima; Minoru Kamiyama, both of Japan

[21] Appl. No.: 228,706

[22] Filed: Apr. 18, 1994

Related U.S. Application Data

[62] Division of Ser. No. 957,285, Oct. 6, 1992, Pat. No. 5,348,764.

[51] Int. Cl.⁶ ............................ B05C 7/00; B05C 7/08
[52] U.S. Cl. ..................................... 118/105; 156/287; 156/94; 264/36; 118/612
[58] Field of Search ................... 118/105, 612; 264/36; 156/94, 287; 427/140, 142, 230, 238, 239, 294, 295, 372.2

[56] References Cited

U.S. PATENT DOCUMENTS 4,581,247 4/1986 Wood .................... 427/53.1
5,091,417 5/1991 Northcutt ................ 427/54.1

FOREIGN PATENT DOCUMENTS 0034910 3/1982 Japan .................... 118/105
60-242038 1/1984 Japan .

*Primary Examiner*—W. Gary Jones
*Assistant Examiner*—Mark DeSimone
*Attorney, Agent, or Firm*—Whitham, Curtis, Whitham & McGinn

[57] ABSTRACT

An improved method for impregnating a tubular lining material with a hardenable liquid resin employed in a pipe repair operation by lining the pipe internally with the lining material; the method comprises (a) supplying about the same amounts of the same hardenable liquid resin to two mixing baths, (b) mixing the hardenable liquid resin with an agent to retard hardening and another agent selected from catalyst to facilitate hardening and hardener in one of the mixing baths, and, at the same time, mixing the hardenable liquid resin with a hardening accelerator in another one of the mixing baths, (c) supplying predetermined amounts of these mixtures to a static mixer from the respective mixing baths, (d) mixing these mixtures together in the static mixer to obtain a final mixture of hardenable resin, (e) supplying the final mixture to the tubular lining material, and (f) impregnating the tubular lining material with the final mixture.

16 Claims, 2 Drawing Sheets mixed hardenable resins mixed hardenable resins

METHOD FOR IMPREGNATING A LINING MATERIAL WITH A HARDENABLE RESIN

This application is a divisional of application Ser. No. 07/957,285, filed on Oct. 6, 1992, now U.S. Pat. No. 5,348,764.

BACKGROUND OF THE INVENTION

The present invention relates to a method for impregnating (soaking) a lining material with a hardenable liquid resin, which method is employed in a repair operation on an old or defective pipe, such as a Hume concrete pipe, by newly lining the pipe internally with the lining material.

DESCRIPTION OF THE PRIOR ART

When an underground utility pipe or an underground industrial pipe, such as sewer pipe, gas pipe and electric conduit pipe, becomes defective or too old, the pipe is repaired and reinforced without digging the earth to expose the pipe and disassembling the sections of the pipe. This non-digging method of repairing an underground pipe is known and practiced in the field of civil engineering. Typically, the method is disclosed by Japanese Provisional Patent Publication (Kokai) No. 60-242038.

According to the publication, this method of pipe repair comprises inserting a sufficiently long tubular flexible liner bag into the pipe to be repaired by means of a pressurized fluid, like air or water. The tubular liner bag is made of a flexible resin-absorbable material impregnated with a thermosetting resin, and has the outer surface coated with a hermetic film. More particularly, according to the publication, the tubular flexible liner bag is closed at one end and open at the other; the tubular flexible liner bag is first flattened, then, the closed end of the tubular liner bag is tied to a control rope; the open end of the tubular liner bag is made to gape wide and hooked at the end of the defective or old pipe in a manner such that the wide-opened end of the liner completely and fixedly covers and closes the pipe end; a portion of the liner is pushed into the pipe; then, the pressurized fluid is applied to the said portion of the tubular liner such that the fluid urges the tubular liner to enter the pipe. Since one end of the tubular liner is hooked at the end of the pipe, it remains there while the rest of the flexible liner bag is turned inside out as it proceeds deeper in the pipe. (Hereinafter, this manner of insertion shall be called "reversing".) When the entire length of the tubular liner bag is reversed (or turned inside out) into the pipe, the control rope holds the closed end of the tubular liner bag to thereby control the length of the tubular liner in the pipe. Then, the reversed tubular liner is pressed against the inner wall of the pipe by the said pressurized fluid, and the tubular flexible liner is hardened as the thermosetting resin impregnated in the liner is heated, which is effected by heating the fluid filling the tubular liner bag by means of a hot steam, etc. It is thus possible to line the inside wall of the defective or old pipe with a rigid liner without digging the ground and disassembling the pipe sections.

This pipe repair method must comprise a step wherein the flexible resin-absorbable material is impregnated with a hardenable resin, and this impregnation was conducted in the following conventional procedures: (1) the hardenable resin is admixed in advance with a hardening accelerator or a photosensitizer, then this resin is mixed with a catalyst to facilitate hardening or a hardener at site by means of a mixer, and the mixture is charged into the body of the tubular liner bag to effect the impregnation; or (2) the hardenable resin already mixed with a hardening accelerator or a photosensitizer is sent into a mixer by means of a large-sized quantity measuring pump, and a catalyst to facilitate hardening or a hardener is sent into the same mixer by means of small-sized quantity measuring pump to thereby obtain a mixture, which is charged into the body of the tubular liner bag to effect the impregnation.

PROBLEMS THE INVENTION SEEKS TO SOLVE

However, in the method (1), if the amount of the hardenable resin used is relatively large, the time required for mixing the resin with the catalyst or hardener must be so long that a considerable amount of air is trapped in the resin mixture and the unpleasant smell from the mixture becomes unbearable.

In the case of the method (2), the hardenable resin sent by the large-sized quantity measuring pump differs from the catalyst or the hardener sent by the small-sized quantity measuring pump in dosage, viscosity and specific gravity so much that the quantity measuring pumps are required to be highly sophisticated and must be controlled in a complicated manner, and what is more, a highly technical control of the temperatures is essential in the mixing operation.

The present invention was contrived in view of the above problems, and it is, therefore, an object of the invention to provide a method for impregnating a lining material with a hardenable resin which requires only simple apparatuses and easy operation.

MEANS TO SOLVE THE PROBLEMS

In order to attain the above and other objects of the invention, there is provided an improved method for impregnating a tubular lining material with a hardenable liquid resin employed in a pipe repair operation by lining the pipe internally with the lining material; the method comprises the steps of (a) supplying about the same amounts of the same hardenable liquid resin to two mixing baths, (b) mixing the hardenable liquid resin with an agent to retard hardening and another agent selected from catalyst to facilitate hardening and hardener in one of the mixing baths, and, at the same time, mixing the hardenable liquid resin with a hardening accelerator in another one of the mixing baths, (c) supplying predetermined amounts of these mixtures to a static mixer from the respective mixing baths, (d) mixing these mixtures together in the static mixer simultaneously as the mixtures are supplied, to obtain a final mixture of hardenable resin, (e) supplying the final mixture to the tubular lining material, and (f) impregnating the tubular lining material with the final mixture.

EFFECTS

According to the invention, since the hardenable liquid resin is first divided into about the same amounts, there occur no substantial differences in quantity, viscosity and specific gravity between these portions before they are pumped to a mixer; consequently, it is possible to simplify the structure and control of the equipment such as the quantity measuring pumps, and furthermore, it is also possible to simplify the temperature control of the hardenable resin.

The mixture dividends are measured into the static mixer simultaneously by the quantity measuring pumps, and they are stirred and mixed together as they are supplied to the mixer, so that unlike the conventional procedure, wherein entire dosages of the elements are mixed together all at once, the mixing operation is conducted rationally and efficiently with the result that the stirring and mixing time is substantially shortened, and consequently, the amount of air trapped in the resin mixture will be greatly reduced and the unpleasantness owing to the smell from the mixture will be felt only briefly.

The above and other objects and features of the invention will appear more fully hereinafter in the following description given in connection with the accompanying drawings and the novelty thereof pointed out in the appended claims.

EMBODIMENTS

Next, an embodiment of the invention, which is considered the best mode, will be described with reference to the attached drawings.

Figure 1:
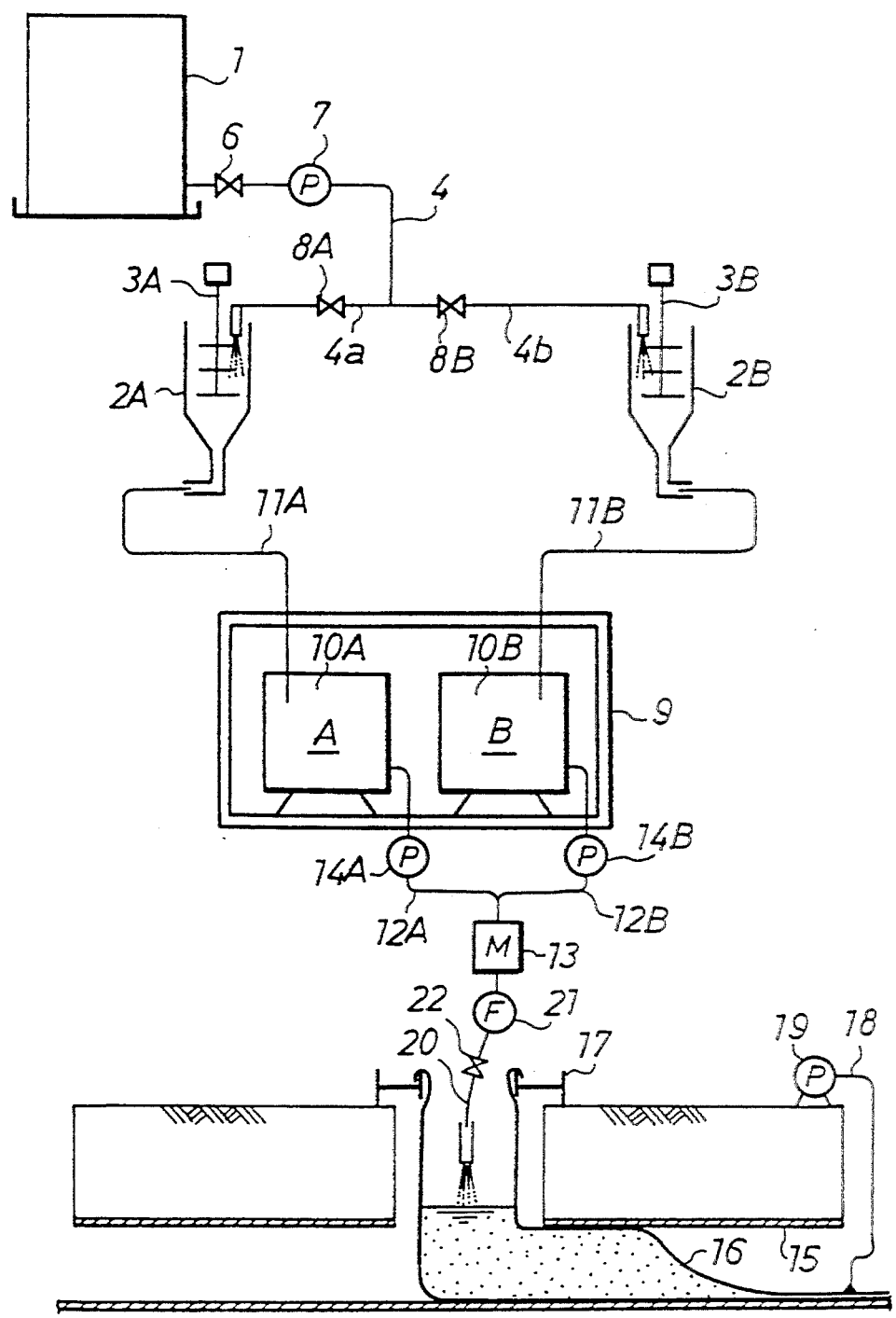
FIG. 1 is a schematic drawing of the apparatuses used in the impregnation operation, showing the site of the pipe repair in cross section.
Figure 2:
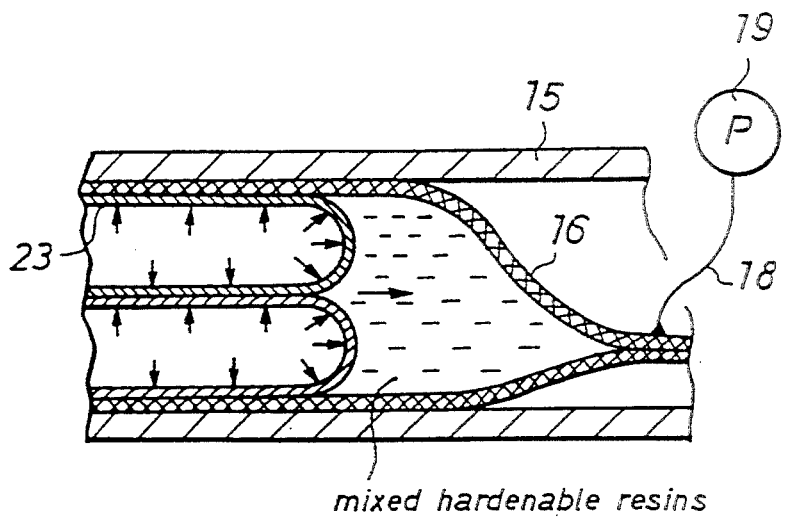
FIG. 2 is a fragmentary cross section of the pipe being repaired, showing how the tubular lining material is impregnated with the hardenable resin.

FIG. 1 is a schematic drawing of the apparatuses used in the impregnation operation and shows the site of the pipe repair in cross section. FIG. 2 is a fragmentary cross section of the pipe being repaired, showing how the hardenable resin is impregnated into the tubular lining material.

In FIG. 1, the reference numeral 1 designates a resin tank installed in a plant, which contains a hardenable resin, which may be a thermosetting, unsaturated polyester resin or a photosensitive hardenable, unsaturated polyester or epoxy resin.

Also in FIG. 1, the reference numerals 2A and 2B designate mixing baths respectively equipped with stirrers 3A and 3B. A resin transportation pipe 4 extends from the lower part of the resin tank 1 and diverges into branch pipes 4a and 4b, whose terminals open respectively over the mixing baths 2A and 2B. Incidentally, a valve 6 and a resin pump 7 are installed across the pipe 4; a valve 8A is installed across the branch pipe 4a and a valve 8B across the branch pipe 4b.

In FIG. 1, the reference numeral 9 designates a transportable refrigeration container, housing tanks 10A and 10B. To the tank 10A is detachably connected a resin hose 11A extending from the bottom of the mixing bath 2A, and to the tank 10B is connected similarly a resin hose 11B extending from the bottom of the mixing bath 2B. Hoses 12A and 12B leading out from the tanks 10A and 10B, respectively, join together and terminate in a static mixer 13. A quantity measuring pump 14A is provided across the resin hose 12A, and a quantity measuring pump 14B of the same type and with the same capacity as the pump 14A is provided across the resin hose 12B.

A tubular liner bag 16 is drawn in an aged pipe 15 buried in the ground. The closed end of the tubular liner bag 16 is inside the pipe 15, and the other end is agape and hooked on a support frame 17 installed on the ground. Incidentally, a vacuum pump 19 is connected to the closed end of the tubular liner bag 16 via a vacuum hose 18. And although it is not shown, the outer surface of the tubular liner bag 16 is closely covered with a hermetic flexible film so that when the vacuum hose 18 sucks the tubular liner bag 16, the pressure in the thickness of the tubular liner bag 16 is reduced to facilitate its impregnation with the hardenable liquid resin. Also, this hermetic film is necessary in order the to prevent the hardenable liquid resin from wetting the inner wall of the aged pipe.

A resin hose 20 extending from the static mixer 13 has its end opening in the gape of the tubular liner bag 16; a flow meter 21 and a valve 22 are provided across the resin hose 20 in series.

The operation of impregnating the tubular liner bag 16 with a hardenable resin is conducted in the following manner.

As the resin pump 7 is driven, the hardenable resin in the resin tank 1 is drawn into the pipe 4 and pushed into the branch pipes 4a and 4b in roughly equal amounts (or in exactly equal amounts), whence the divisions of the resin are sent to the mixing baths 2A and 2B, respectively. In the mixing bath 2A, the hardenable resin is combined with an agent to retard hardening and one selected from catalyst to facilitate hardening reaction and hardener, and these are stirred and mixed thoroughly by means of the stirrer 3A, and a liquid mixture A is obtained. On the other hand, in the mixing bath 2B, the hardenable resin is combined with either a hardening accelerator or a photosensitizer, and these are stirred and mixed thoroughly by means of the stirrer 3B, and a liquid mixture B is obtained. Incidentally, it is possible to secure necessary pot lives of the liquids A and B by adjusting the dosages of the retardant and the hardener as well as by controlling the temperature.

The liquid A prepared in the mixing bath 2A is transported through the resin hose 11A and received in the cold tank 10A installed in the refrigeration container 9; similarly, the liquid B is transferred from the mixing bath 2B to the tank 10B. When the tanks 10A and 10B have received predetermined amounts of liquids A and B, respectively, the resin hoses 11A and 11B are detached from the tanks 10A and 10B, respectively; thereafter, the refrigeration container 9 is transported to the pipe repair site.

At the repair site, the quantity measuring pumps 14A and 14B are driven and the liquids A and B are measured into the static mixer 13 via the respective resin hoses 12A and 12B, and the two liquids A and B are uniformly mixed in the static mixer 13. The resulting mixture of hardenable resins A and B is supplied into the tubular liner bag 16 by way of the resin hose 20.

When a predetermined amount of the mixed hardenable resin has been supplied into the tubular liner bag 16, a tubular flexible open liner 23 is reversely inserted into the tubular liner bag 16, as shown in FIG. 2, by means of a fluid pressure, and as the open liner 23 is reversed it forces the liquid resin to move deeper into the liner bag 16, thereby inflating the liner bag 16. Thus, the liquid resin wets the entire length of the liner bag 16. At the same time, the vacuum pump 19 is driven to suck the liner bag 16, which is thereby soaked through with the hardenable liquid resin; thus the impregnation is completed.

While maintaining the fluid pressure in the open liner 23 sufficiently high to thereby press the tubular liner bag 16 onto the inner wall of the aged pipe 15, either heat or light is applied to the hardenable resin soaked in the tubular liner bag 16, depending on the kind of the hardenable resin; then, the hardenable resin hardens, and the aged pipe 15 is internally lined with the hard resin and thus reinforced.

In this embodiment, since the liquid hardenable resin is divided into about the same amounts, there occur no substantial differences in quantity, viscosity and specific gravity between the liquid mixtures A and B before they are sent to the static mixer 13; consequently, it is possible to simplify the structure and control of the equipment such as the quantity measuring pumps 14A and 14B, and furthermore, it is also possible to simplify the temperature control of the hardenable resin.

The mixture liquids A and B are measured into the static mixer 13 simultaneously by the quantity measuring pumps 14A and 14B, and they are stirred and mixed together as they are supplied to the mixer 13, so that unlike the conventional procedure, wherein entire dosages of the elements are mixed together all at once, the mixing operation is conducted rationally and efficiently with the result that the stirring and mixing time is substantially shortened, and consequently, the amount of air trapped in the resin mixture will be greatly reduced and the unpleasantness owing to the smell from the mixture will be felt only briefly.

Figure 3:
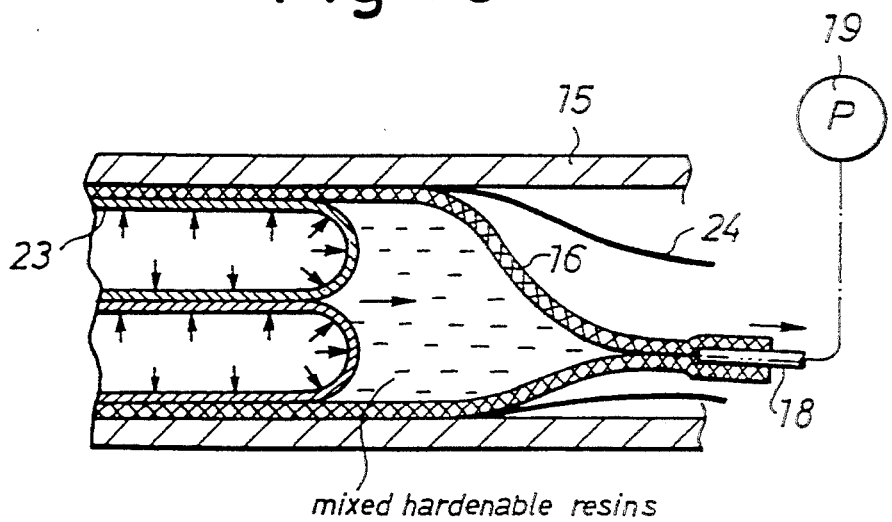
FIG. 3 is a fragmentary cross section of the pipe, similar to FIG. 2, showing how the tubular lining material is impregnated with the hardenable resin.

Referring now to FIG. 3, a different manner of resin impregnation will be described. The tubular lining bag 16 is not covered with a hermetic film, but a hermetic flexible guide tube 24 made of a plastic film similar to the hermetic film is placed in the pipe 15 to loosely wrap around the tubular liner bag 16. The open end of a vacuum hose 18 connected to the vacuum pump 19 is inserted in the narrow space inside the flattened portion of the liner bag 16, and as the hardenable resin is pushed deeper in the liner bag 16 (rightward, in FIG. 3) thereby inflating the flattened portion of the liner bag 16, the vacuum hose 18, while sucking the air, is drawn away from the approaching hardenable resin. As the vaccum hose sucks the air, the flexible guide tube 24 is pulled to fit closely on the outer surface of the liner bag 16; therefore, the pressure in the thickness of the flattened portion of the tubular liner bag 16 is reduced and thus the impregnation of the tubular bag 16 with the hardenable resin is facilitated. In this procedure, the operation of covering the tubular liner bag 16 with the flexible film is effected simultaneously as the impregnation operation.

While the invention has been described in its preferred embodiment, it is to be understood that modifications will occur to those skilled in that art without departing from the spirit of the invention. The scope of the invention is therefore to be determined solely by the appended claims.

What is claimed is:

1. A system for impregnating a tubular lining material with a hardenable liquid resin employed in a pipe repair operation by lining the pipe internally with the lining material, said system comprising a resin tank, two mixing baths connected to said resin tank such that equal amounts of the resin can be supplied to the mixing baths, two tanks installed in a transportable refrigerator, said tanks being detachably connected to said mixing baths, respectively, and a static mixer connected to said tanks via quantity measuring pumps such that measured amounts of the mixed resins can be supplied to the static mixer.

2. A system as recited in claim 1, wherein one of said two mixing baths mixes one of said equal amounts of said resin with a hardener, a catalyst and an agent to retard hardening and another of said two mixing baths mixes said another of said equal amounts of said resin with a hardening accelerator.

3. A system as recited in claim 1, further including means for introducing a mixture of said mixed resins from said static mixer into a tubular liner bag.

4. A system as recited in claim 3, further including means for forcing said mixture of mixed resins into said tubular liner bag.

5. A system as recited in claim 4, wherein said means for forcing said mixture of mixed resins into said tubular liner bag includes means for applying a vacuum to said tubular liner bag.

6. A system as recited in claim 5, further including a flexible guide tube adapted to be pulled to fit closely on the outer surface of said tubular liner bag.

7. A system as recited in claims 4, wherein said means for forcing said mixture of mixed resins into said tubular liner bag includes an inflatable tubular liner.

8. A system as recited in claim 7, wherein said means for forcing said mixture of mixed resins into said tubular liner bag includes means for applying a vacuum to said tubular liner bag.

9. A system as recited in claim 8, further including a flexible guide tube adapted to be pulled to fit closely on the outer surface of said tubular liner bag.

10. A system as recited in claim 2, further including means for introducing a mixture of said mixed resins from said static mixer into a tubular liner bag.

11. A system as recited in claim 10, further including means for forcing said mixture of mixed resins into said tubular liner bag.

12. A system as recited in claim 11, wherein said means for forcing said mixture of mixed resins into said tubular liner bag includes means for applying a vacuum to said tubular liner bag.

13. A system as recited in claim 12, further including a flexible guide tube adapted to be pulled to fit closely on the outer surface of said tubular liner bag.

14. A system as recited in claims 12, wherein said means for forcing said mixture of mixed resins into said tubular liner bag includes an inflatable tubular liner.

15. A system as recited in claim 14, wherein said means for forcing said mixture of mixed resins into said tubular liner bag includes means for applying a vacuum to said tubular liner bag.

16. A system as recited in claim 15, further including a flexible guide tube adapted to be pulled to fit closely on the outer surface of said tubular liner bag.

* * * * *